(12) United States Patent
Hayashi et al.

(10) Patent No.: US 10,539,100 B2
(45) Date of Patent: Jan. 21, 2020

(54) VALVE DEVICE

(71) Applicant: DENSO CORPORATION, Kariya, Aichi-pref. (JP)

(72) Inventors: Hideki Hayashi, Kariya (JP); Yuichiro Moritani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/081,454

(22) PCT Filed: Jan. 27, 2017

(86) PCT No.: PCT/JP2017/002844
§ 371 (c)(1),
(2) Date: Aug. 31, 2018

(87) PCT Pub. No.: WO2017/150026
PCT Pub. Date: Sep. 8, 2017

(65) Prior Publication Data
US 2019/0078538 A1    Mar. 14, 2019

(30) Foreign Application Priority Data
Mar. 3, 2016  (JP) .................................. 2016-041122

(51) Int. Cl.
*F16K 1/20*      (2006.01)
*F02M 26/70*   (2016.01)
(Continued)

(52) U.S. Cl.
CPC ............ *F02M 26/70* (2016.02); *F02M 26/21* (2016.02); *F02M 26/64* (2016.02); *F02M 26/71* (2016.02);
(Continued)

(58) Field of Classification Search
CPC .. F02M 26/21; F02M 26/64; F02M 26/70–72; F16K 1/20; F16K 1/205;
(Continued)

(56) References Cited

U.S. PATENT DOCUMENTS

| | | | |
|---|---|---|---|
| 2005/0072953 A1* | 4/2005 | Caprera | F16K 5/0668 251/315.01 |
| 2018/0335149 A1* | 11/2018 | Trudel | F16K 1/2265 |
| 2019/0128426 A1* | 5/2019 | Abouelleil | F16K 1/2265 |

FOREIGN PATENT DOCUMENTS

| | | |
|---|---|---|
| JP | 2008-232260 | 10/2008 |
| JP | 2013-44415 | 3/2013 |

(Continued)

*Primary Examiner* — Erick R Solis
(74) *Attorney, Agent, or Firm* — Nixon & Vanderhye P.C.

(57) ABSTRACT

A valve device includes a shaft, a valve body, and a housing including a valve opening. An outwardly facing surface of the valve body is out of contact with the housing and a valve-facing surface is in contact with the housing in a fully closed state in which the valve body closes the valve opening. A valve seal surface includes a first valve seal surface protruding in a valve closing direction and a second valve seal surface recessed in a valve opening direction. A first seal distance in a radial direction from an outer diameter end of the first valve seal surface to a rotation axis is shorter than a second seal distance in the radial direction from an outer diameter end of the second valve seal surface to the rotation axis. The first valve seal surface and the second valve seal surface each have at least a curved surface.

9 Claims, 11 Drawing Sheets

(51) Int. Cl.
　　　*F02M 26/64*　　　(2016.01)
　　　*F16K 3/22*　　　(2006.01)
　　　*F16K 5/04*　　　(2006.01)
　　　*F16K 11/076*　　(2006.01)
　　　*F02M 26/71*　　　(2016.01)
　　　*F02M 26/21*　　　(2016.01)
　　　*F02M 26/72*　　　(2016.01)
　　　*F16K 1/226*　　　(2006.01)

(52) U.S. Cl.
　　　CPC ............... *F02M 26/72* (2016.02); *F16K 1/20* (2013.01); *F16K 1/205* (2013.01); *F16K 1/2265* (2013.01); *F16K 3/22* (2013.01); *F16K 5/04* (2013.01); *F16K 5/0478* (2013.01); *F16K 11/076* (2013.01)

(58) Field of Classification Search
　　　CPC ........ F16K 1/2064; F16K 1/2265; F16K 3/22; F16K 5/0478; F16K 11/076
　　　USPC ........................................ 123/568.18, 568.19
　　　See application file for complete search history.

(56) References Cited

FOREIGN PATENT DOCUMENTS

| | | |
|---|---|---|
| JP | 2017-8870 | 1/2017 |
| WO | 2010/046032 | 4/2010 |

\* cited by examiner (a)

(b)

(a) FULLY OPENED STATE (b) FULLY CLOSED STATE (c) PARTIALLY OPENED STATE (a)

(b)

VALVE DEVICE

CROSS REFERENCE TO RELATED APPLICATION

This application is the U.S. national phase of International Application No. PCT/JP2017/002844 filed on Jan. 27, 2017 which designated the U.S. and claims priority to Japanese Patent Application No. 2016-41122 filed on Mar. 3, 2016, the entire contents of each of which are incorporated herein by reference.

TECHNICAL FIELD

The present disclosure relates to a valve device opening and closing a valve opening which is open in a housing by using a cylindrical surface or a spherical surface provided to a valve body.

BACKGROUND ART

Patent Literature 1 discloses a technique for a valve device configured as above.

The technique disclosed in Patent Literature 1 is adopted in a valve device which uses a valve body having a cylindrical surface. When the valve body is rotated in a valve closing direction, the valve body closes a valve opening provided to the housing by allowing a valve-facing surface of the valve body to make contact with a housing. The valve-facing surface is a surface of the valve body facing in a rotational direction.

PRIOR ART LITERATURES

Patent Literature

Patent Literature 1: JP2013-044415A

SUMMARY OF INVENTION

The technique disclosed in Patent Literature 1 describes that four seal sides are provided to the valve body to make contact with the housing when the valve body closes the valve opening.

In the following description, the four seal sides provided to the valve body are given as first through fourth seal sides.

The first seal side is a plane provided to the valve body at one end in the valve closing direction and is parallel to a rotation axis of the valve body.

The second seal side is a plane provided to the valve body at one end in a valve opening direction and is parallel to the rotation axis of the valve body as with the first seal side.

The third seal side is a plane connecting a first end of the first seal side and a first end of the second seal side.

The fourth seal side is a plane connecting a second end of the first seal side and a second end of the second seal side.

Given an extending direction of the rotation axis of the valve body as an axial direction, then the first seal side is made shorter than the second seal side in the axial direction.

That is, the third seal side and the fourth seal side are not parallel to each other and provided as inclined surfaces which become narrower in the valve closing direction. In other words, the third seal side and the fourth seal side form tapered surfaces which become narrower in the valve closing direction. Given an angle of the inclined surface with respect to the rotational direction as an inclined angle, then inclined angles of the third seal side and the fourth seal side are made small.

When the valve opening is in a fully closed state, the third seal side and the fourth seal side are pressed against the housing. Because the third seal side and the fourth seal side are inclined surfaces, the third seal side and the fourth seal side bite into the housing in the fully closed state. Accordingly, a large drive torque is required to release the biting when a valve opening operation is started in the fully closed state.

The biting means a binding force produced on the inclined surface by friction and pressing. A strong binding force is produced between two inclined surfaces pressed hard against each other as the principle of a wedge. That is, when a contact surface is inclined with respect to a force applying direction, a thrusting force acting on the inclined surface in a vertical direction increases as the inclined angle becomes smaller. A pressing force reacting to the thrusting force is also applied to the inclined surface. The binding force is produced on the inclined surface when the pressing force acts on a frictional face of the inclined surface. The force thus produced is called the biting.

The present disclosure has an object to provide a valve device capable of reducing a drive torque when a valve opening operation is started in a fully closed state by preventing a valve body from biting into a housing in a fully closed state while a valve body is rotated without an outwardly facing surface of a valve body sliding on a housing.

According to an aspect of the present disclosure, the valve device includes a shaft to rotate in response to an operation, a valve body to rotate integrally with the shaft and to have an outer peripheral surface provided with at least a part of a cylindrical surface or a spherical surface, and a housing including a valve opening in a valve chamber to rotatably store the valve body, the valve opening to be opened and closed by the valve body. When a direction along a radius of the shaft is expressed as a radial direction including a direction to an outer diameter and a direction to an inner diameter, a surface of the valve body facing in a direction to the outer diameter is expressed as an outwardly facing surface, a direction in which the valve body rotates about the shaft is expressed as a rotational direction, and a surface of the valve body facing in the rotational direction is expressed as a valve-facing surface, the outwardly facing surface of the valve body is to be out of contact with the housing and the valve-facing surface is to be in contact with the housing in a fully closed state in which the valve body closes the valve opening. When the rotational direction toward a direction in which the valve body closes the valve opening is expressed as a valve closing direction, the rotational direction toward a direction in which the valve body opens the valve opening is expressed as a valve opening direction, a surface of the valve-facing surface making contact with the housing in the fully closed state is expressed as a valve seal surface, and a surface of the housing where contact with the valve seal surface is expressed as a housing seal surface, the valve seal surface includes a first valve seal surface that protrudes in the valve closing direction and a second valve seal surface that is recessed in the valve opening direction. When a rotation center of the shaft and the valve body is expressed as a rotation axis, a distance in the radial direction from an outer diameter end of the first valve seal surface to the rotation axis is expressed as a first seal distance, and a distance in the radial direction from an outer diameter end of the second valve seal surface to the rotation axis is expressed as a second seal distance, the first seal distance is shorter than the second seal distance. The first valve seal surface and the second valve seal surface each have at least a curved surface.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
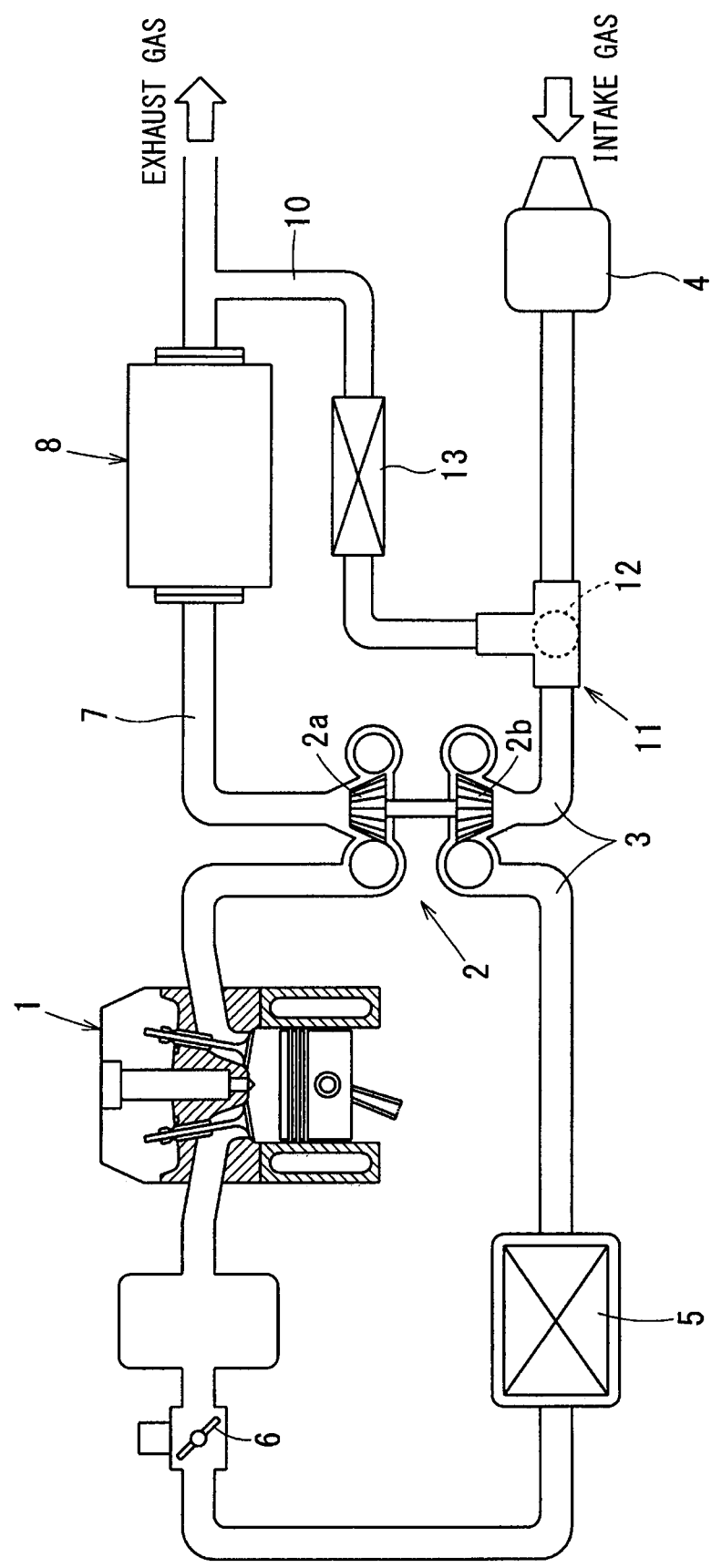
FIG. 1 is a schematic view of an air intake and exhaust system of an engine according to a first embodiment of the present disclosure.

Hereinafter, multiple embodiments for carrying out the present disclosure will be described with reference to accompanying drawings. The following embodiments are examples of the present disclosure, and the present disclosure is not limited to the embodiments.

First Embodiment

A first embodiment will be described with reference to FIG. 1 through FIG. 5.

An air intake and exhaust system of an engine 1 to run a vehicle is equipped with a turbocharger 2 in which a compressor 2b is driven to supercharge intake air by a turbine 2a that rotates with an exhaust gas discharged from the engine 1. The configuration as above is a mere example and the air intake and exhaust system may not be equipped with a supercharger, such as the turbocharger 2.

The engine 1 is a typical internal combustion engine which generates rotative power by burning fuel and may be either a diesel engine running on light oil or the like as fuel or a gasoline engine running on gasoline as fuel.

An intake passage 3 leading intake air to the engine 1 has an air cleaner 4, the compressor 2b, an intercooler 5, a throttle valve 6, and so on, which are provided sequentially from upstream to downstream in a flow of intake air. When the air intake and exhaust system is not equipped with a supercharger, such as the turbocharger 2, the intercooler 5 is omitted. When the engine 1 is a diesel engine, the throttle valve 6 may be omitted.

An exhaust passage 7 leading an exhaust gas discharged from the engine 1 has the turbine 2a, an exhaust disposal device 8, an unillustrated muffler, and so on, which are provided sequentially from upstream to downstream in a flow of exhaust gas. The exhaust disposal device is a catalyst, a DPF (Diesel Particulate Filter), or the like.

The air intake and exhaust system of the engine 1 includes an EGR device.

The EGR device of the present embodiment is of an LPL (Low Pressure Loop) type and returns a part of an exhaust gas as an EGR gas from downstream of the exhaust disposal device 8 in the flow of exhaust gas to upstream of the compressor 2b in the flow of intake air.

The EGR device will now be described concretely.

The EGR device includes an EGR passage 10 which leads an EGR gas to the intake passage 3 by connecting the exhaust passage 7 downstream of the exhaust disposal device 8 in the flow of exhaust gas and the intake passage 3 upstream of the compressor 2b in the flow of intake air.

The EGR device includes an EGR valve 11 which not only opens and closes the EGR passage 10 and adjusts an opening degree of the EGR passage 10 but is also capable of producing a negative intake pressure at a merging point of the intake passage 3 and the EGR passage 10.

The EGR device includes an electrical drive unit 12 by which the EGR valve 11 is driven.

The EGR device includes an EGR cooler 13 at a midpoint of the EGR passage 10 to cool the EGR gas flowing to the EGR valve 11. The EGR gas mixes with intake air at the EGR valve 11 and forms an air-fuel mixture, which flows into the intake passage 3.

The EGR valve 11 will now be described concretely.

The intake passage 3 and the EGR passage 10 merge at a point upstream of the compressor 2b in the flow of intake air. Hence, a negative intake pressure is hardly produced at the merging point in comparison with a point downstream of the throttle valve 6 in the flow of intake air. When a negative intake pressure is small, a large amount of the EGR gas cannot be returned from the EGR passage 10 to the intake passage 3.

To overcome such an inconvenience, the EGR valve 11 of the present embodiment is furnished with a function of an intake throttle valve which produces a large negative intake pressure at the merging point of the intake passage 3 and the EGR passage 10. Owing to the function of the intake throttle valve, a large amount of the EGR gas can be returned toward an intake port of the engine 1 by producing a large negative intake pressure at the merging point of the intake passage 3 and the EGR passage 10.

The EGR valve 11 is a concrete example of the valve device and includes a shaft 14, a valve body 15, and a housing 16.

The shaft 14 is supported in a rotatable manner on the housing 16 via bearings or the like and operated by the drive unit 12 described above. A coupling structure of the shaft 14 and the drive unit 12 is not limited. An example adopted in the present embodiment is a structure by which an angle of the shaft 14 in a rotational direction can be fixed at a desirable position with respect to an output portion of the drive unit 12.

For example, a drive plate coupled to the shaft 14 and thereby rotating integrally with the shaft 14 is provided to the output portion of the drive unit 12. The drive plate is provided with a through-hole in which to insert a small diameter shaft portion 14a formed at a tip end of the shaft 14. After the small diameter shaft portion 14a is inserted into the through-hole, a tip end of the small diameter shaft portion 14a exposed to an outside of the through-hole is crushed and expanded in diameter by plastic deformation. A positional relationship between the shaft 14 and the drive plate is thus fixed. Multiple dents recessed in a direction to an outer diameter are provided to an inner peripheral surface of the through-hole. The diameter-expanded part of the small diameter shaft portion 14a partially bites into inner sides of the dents. The shaft 14 and the drive plate are thus coupled to each other firmly. The coupling technique described above is a mere example. Alternatively, width across flats (see FIG. 9) may be provided at a tip end of the shaft 14 and the shaft 14 and the drive plate may be coupled to each other in the rotational direction by fitting the width across flats to width across flats provided to the through-hole in the drive plate.

An outer peripheral surface of the valve body 15 is provided with at least a part of a cylindrical or spherical surface, and a part of a cylindrical surface is provided to the outer peripheral surface in the present embodiment.

The housing 16 is a so-called valve housing and includes a valve chamber α defined by a substantially cylindrical space in which to store the valve body 15 in a rotatable manner. A valve opening 10a that is open in the valve chamber α is provided inside the housing 16. The valve opening 10a is opened and closed by the valve body 15 rotated in the valve chamber α.

The housing 16 forms a merge portion of the intake passage 3 and the EGR passage 10 and the valve chamber α corresponds to the merge portion of the intake passage 3 and the EGR passage 10. In the present embodiment, a passage led to the valve opening 10a is the EGR passage 10.

Besides the EGR passage 10 led to the valve opening 10a, the housing 16 includes an upstream passage 17 which leads intake air into the valve chamber α, and a downstream passage 18 which leads intake air in the valve chamber α to an outside of the housing 16. Herein, intake air is an example of a fluid outside the housing 16 and is also an example of a fluid in the valve chamber α.

The upstream passage 17 and the downstream passage 18 are a part of the intake passage 3 which leads intake air to the engine 1. A channel center of the upstream passage 17 and a channel center of the downstream passage 18 are positioned on a same straight line C1.

The valve body 15 adjusts an opening degree of the EGR passage 10 and an opening degree of the upstream passage 17. To be more specific, the valve body 15 reduces an opening degree of the upstream passage 17 after an opening degree of the EGR passage 10 exceeds a predetermined opening degree.

By throttling the upstream passage 17 with the valve body 15, a negative intake pressure is forcedly produced in the valve chamber α which is the merging point of the intake passage 3 and the EGR passage 10. It should be noted that even when the upstream passage 17 is throttled to a maximum extent by the valve body 15, the upstream passage 17 is open in part. In a concrete example, even when the upstream passage 17 is throttled to a maximum extent by the valve body 15, approximately 10% of the upstream passage 17 is left open.

The EGR valve 11 is provided with an unillustrated return spring which returns the valve body 15 to a fully closed position with a spring force. The return spring may be disposed either inside or outside the drive unit 12. Alternatively, the return spring may not be provided and the valve body 15 may be operated with a force exerted by the drive unit 12 alone.

The drive unit 12 is typical equipment attached to the outside of the housing 16 and includes an electric motor converting electric power to a rotation torque, and a deceleration mechanism amplifying and transmitting the rotation torque of the electric motor to the shaft 14. The drive unit 12 includes an opening degree sensor which detects an opening degree of the EGR valve 11 by detecting an angle of the shaft 14. Energization of the electric motor is controlled by an ECU (Engine Control Unit) which controls a running state of the engine 1. That is, the ECU controls an angle of the valve body 15 with respect to the housing 16 according to a running state of the engine 1.

A direction along a radius of the shaft 14 is given as a radial direction. The radial direction includes a direction to the outer diameter and a direction to an inner diameter.

A face of the outer peripheral surface of the valve body 15 facing in a direction to the outer diameter is given as an outwardly facing surface of the valve body 15. The outwardly facing surface of the valve body 15 is out of contact with the shaft 14. That is, the outwardly facing surface of the valve body 15 is provided not to make contact with the shaft 14. More concretely, the outwardly facing surface includes a first valve throttle surface 25, a second valve throttle surface 26, and a center throttle surface 30.

A state in which the valve body 15 completely closes the valve opening 10a is given as a fully closed state.

A direction in which the valve body 15 rotates about the shaft 14 is given as a rotational direction.

A center of the outer peripheral surface of the valve body 15 in the rotational direction is given as a valve body center line D0. The valve body center line D0 is a line perpendicular to the rotational direction.

The rotational direction pointing to a direction in which the valve body 15 closes the valve opening 10a is given as a valve closing direction.

The rotational direction pointing to a direction in which the valve body 15 opens the valve opening 10a is given as a valve opening direction.

A surface of the valve body 15 facing in the rotational direction is given as a valve-facing surface. The valve-facing surface of the valve body 15 is not parallel to the rotational direction.

A face of the valve-facing surface making contact with the housing 16 in the fully closed state is given as a valve seal surface. That is, a surface of the valve body 15 and a surface of the housing 16 make contact with each other in the fully closed state, and the surface of the valve body 15 is given as the valve seal surface.

The surface of the housing 16 where contact with the valve seal surface is made is given as a housing seal surface. That is, of the surfaces of the valve body 15 and the housing 16 making contact with each other in the fully closed state, the surface of the housing 16 is given as the housing seal surface.

A face of the valve seal surface protruding in the valve closing direction is given as a first valve seal surface 21.

A face of the valve seal surface recessed in the valve opening direction is given as a second valve seal surface 22.

A face of the housing seal surface making contact with the first valve seal surface 21 is given as a first housing seal surface 23.

A face of the housing seal surface making contact with the second valve seal surface 22 is given as the second housing seal surface 24.

A rotation center of the shaft 14 and the valve body 15 is given as a rotation axis C2.

A distance in the radial direction from an outer diameter end of the first valve seal surface 21 to the rotation axis C2 is given as a first seal distance r1.

A distance in the radial direction from an outer diameter end of the second valve seal surface 22 to the rotation axis C2 is given as a second seal distance r2.

A surface of the valve body 15 opposing an inner wall surface of the valve chamber α with a clearance in between in the fully closed state is given as a valve throttle surface.

A face of the valve throttle surface provided at one end in the valve closing direction is given as the first valve throttle surface 25 and a face provided at one end in the valve opening direction is given as the second valve throttle surface 26.

A distance in the radial direction from the first valve throttle surface 25 to the rotation axis C2 is given as a first valve throttle distance r5.

A distance in the radial direction from the second valve throttle surface 26 to the rotation axis C2 is given as a second valve throttle distance r6.

An extending direction of the channel centers of the upstream passage 17 and the downstream passage 18, that is, a direction in which the straight line C1 described above extends is given as a direction of an x axis, namely an x-axis direction.

A direction perpendicular to the x-axis direction as an extending direction of the rotation axis C2 is given as a direction of a y axis, namely a y-axis direction.

A direction perpendicular to both of the x and y axes is given as a direction of a z axis, namely a z-axis direction. The z-axis direction is a direction perpendicular to both of the x-axis direction and the y-axis direction in the present embodiment.

Assume that the shaft 14 is viewed in the axial direction, then a straight light passing the rotation axis C2 and extending in the z-axis direction is given as a virtual line β.

An inner wall surface of the housing 16 opposing the first valve throttle surface 25 in the fully closed state is given as a first opposing surface 27.

An inner wall surface of the housing 16 opposing the second valve throttle surface 26 in the fully closed state is given as a second opposing surface 28.

A distance in the radial direction from the first opposing surface 27 to the rotation axis C2 is given as a first opposing distance r7.

A distance in the radial direction from the second valve throttle surface 26 to the rotation axis C2 is given as a second opposing distance r8.

The EGR valve 11 is provided to keep the outwardly facing surface of the valve body 15 out of contact with the housing 16 at least in a rotating range of the valve body 15. That is, the first valve throttle surface 25, the second valve throttle surface 26, and the center throttle surface 30 are provided not to make contact with the inner wall surface of the valve chamber α and a seat part 16a.

More specifically, the first opposing distance r7 is made longer than the first valve throttle distance r5 and the second opposing distance r8 is made longer than the second valve throttle distance r6. Also, a rib end distance r9 is made longer than the first seal distance r1.

The EGR valve 11 closes the valve opening 10a with the valve body 15 by allowing the valve-facing surface of the valve body 15 to make contact with the housing 16.

It should be noted that the first seal distance r1 is made shorter than the second seal distance r2.

In addition, the first valve seal surface 21 and the second valve seal surface 22 each have at least a curved surface.

The EGR valve 11 of the first embodiment is a rotary valve in which the valve body 15 has the outer peripheral surface of a cylindrical shape. The valve body 15 is provided integrally with an arm 29 that is fan-shaped and is coupled to the shaft 14. The valve body 15 is a resin molded article moldable with high accuracy. However, the valve body 15 may be molded from a metal material, such as aluminum, by a die casting technique or the like.

Figure 2:
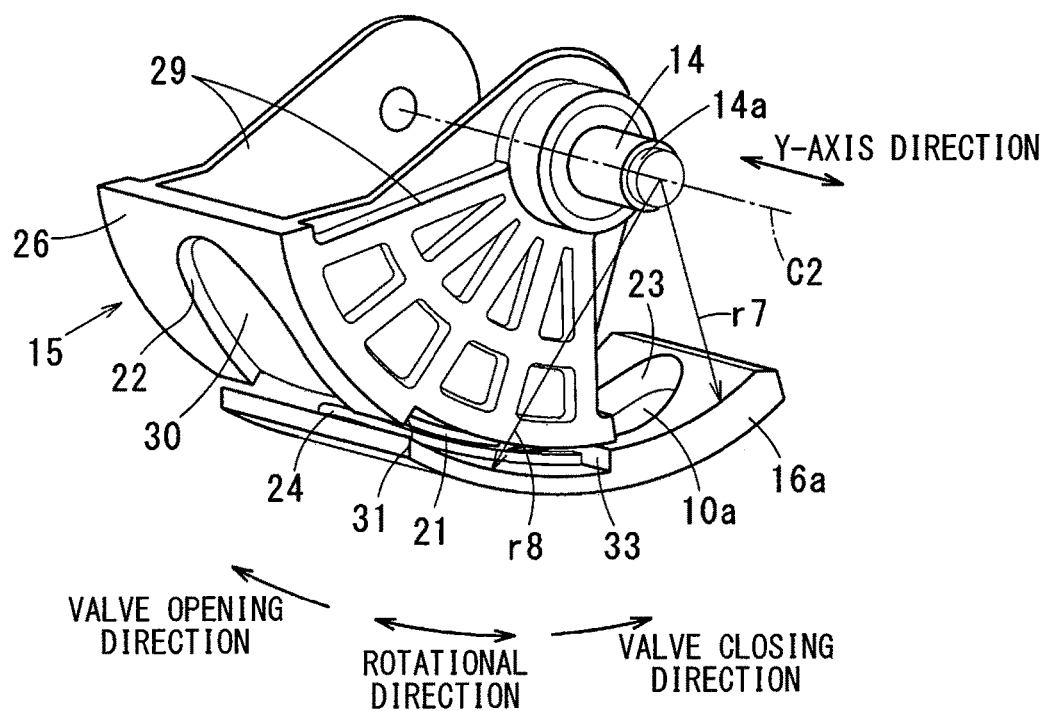
FIG. 2 is a perspective view of a valve body and a seat part in the first embodiment.
Figure 3:
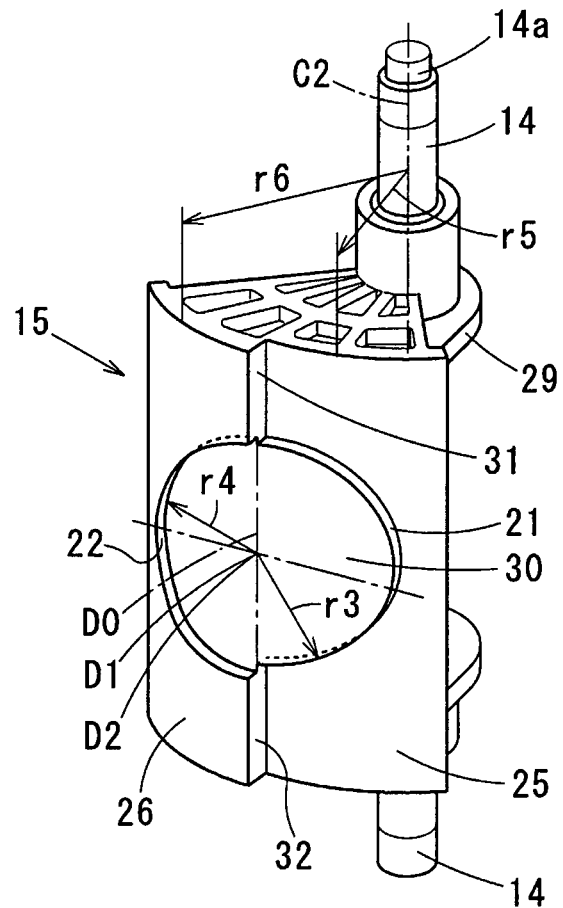
FIG. 3 includes (a) and (b), (a) is a perspective view of the valve body in the first embodiment and (b) is a perspective view of the seat part in the first embodiment.
Figure 3:
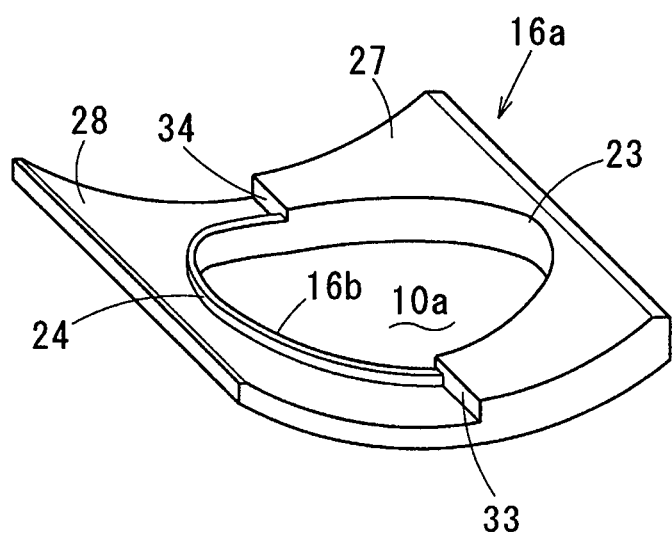
Figure 4:
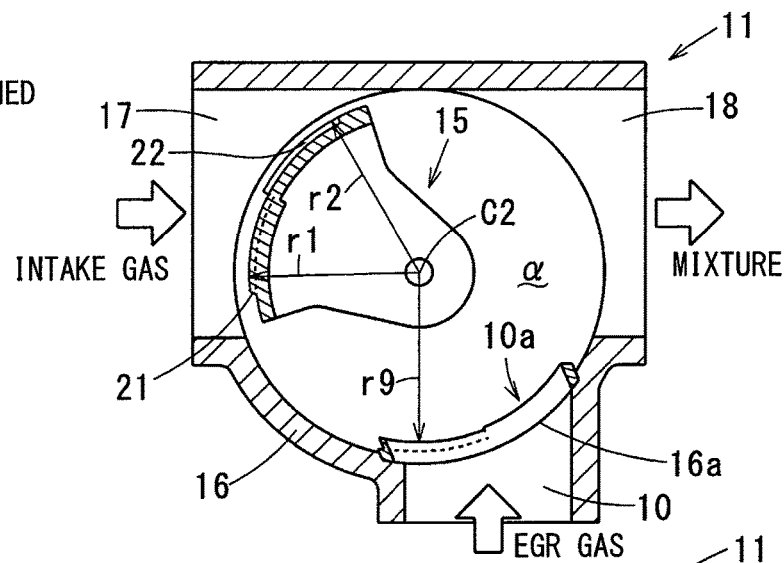
FIG. 4 includes (a), (b) and (c), (a) is a sectional view of an EGR valve in a fully opened state in the first embodiment, (b) is a sectional view of the EGR valve in a fully closed state in the first embodiment, and (c) is a sectional view of the EGR valve in a partially opened state in the first embodiment.
Figure 4:
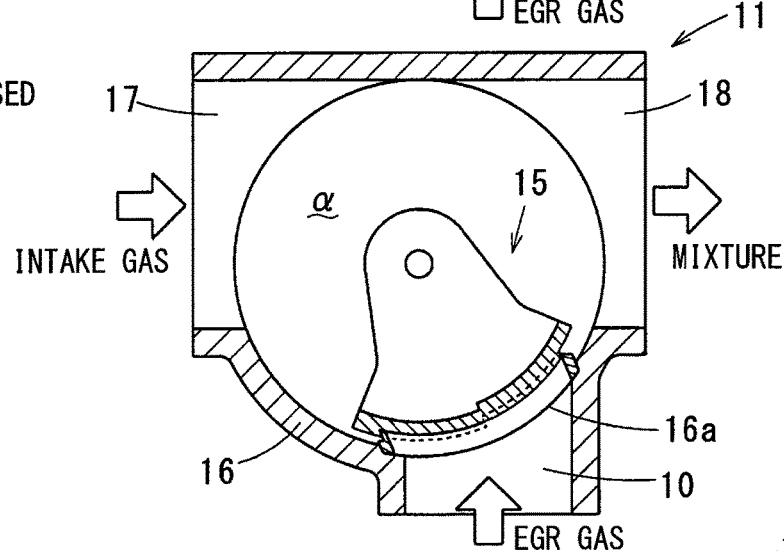
Figure 4:
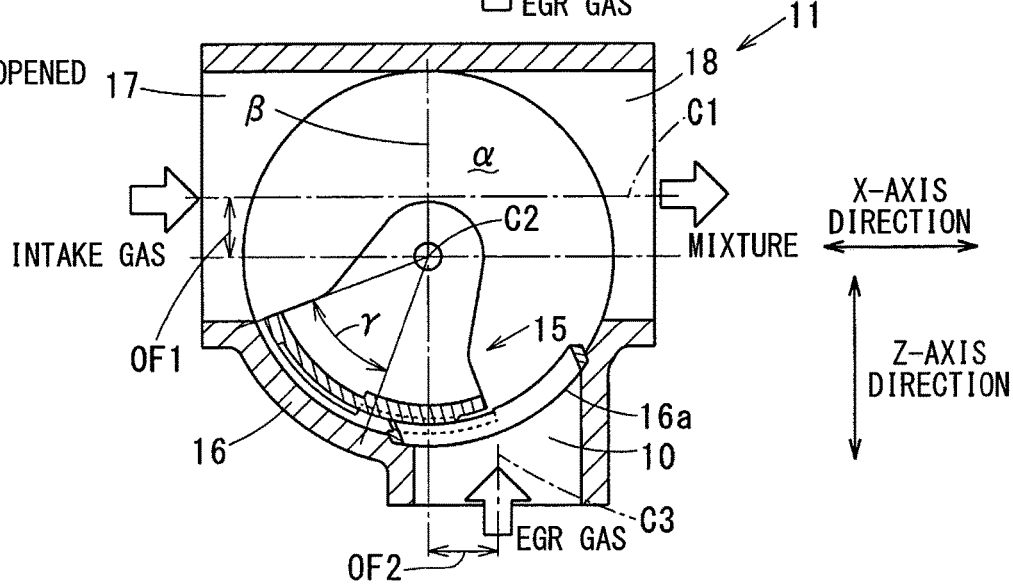

When the valve body 15 is made of resin, as is shown in FIG. 2, it is preferable to provide a reinforcing rib against deformation to each of an outer surface and an inner surface of the arm 29. The present disclosure, however, is not limited to the configuration as above. In FIG. 2, the reinforcing rib provided to the outer surface of the arm 29 is to prevent deformation of the arm 29. In FIG. 2, the reinforcing rib provided to the inner surface of the arm 29 extends inside the cylindrical shape to prevent cylindrical deformation.

The first valve seal surface 21 and the second valve seal surface 22 each are provided as a cylindrical surface. The cylindrical surface is a concrete example of the curved surface described above.

The first valve seal surface 21 is a semi-cylindrical surface with an outer peripheral surface facing in the valve closing direction.

The second valve seal surface 22 is a semi-cylindrical surface with an inner peripheral surface facing in the valve closing direction.

A center D1 of a cylinder forming the first valve seal surface 21 and a center D2 of a cylinder forming the second valve seal surface 22 are provided to fall on each other on the valve body center line D0.

To be more specific, a radius r4 of the cylinder forming the second valve seal surface 22 is made larger than a radius r3 of the cylinder forming the first valve seal surface 21. That is, a relationship expressed as: r3<r4 is established and a radius of curvature of the second valve seal surface 22 is larger than a radius of curvature of the first valve seal surface 21. A relationship as to which is the larger is not limited to the relationship as above and a radius of curvature of the first valve seal surface 21 may be made equal to a radius of curvature of the second valve seal surface 22. In short, a relationship expressed as: r3≤r4 is also acceptable.

The first valve seal surface 21 and the second valve seal surface 22 are provided substantially perpendicularly to the first valve throttle surface 25 and the second valve throttle surface 26, respectively. However, the present disclosure is not limited to the configuration as above and the first valve seal surface 21 and the second valve seal surface 22 each may be inclined with respect to the rotational direction.

Likewise, the first housing seal surface 23 and the second housing seal surface 24 are provided substantially perpendicularly to the first valve throttle surface 25 and the second valve throttle surface 26, respectively. However, when the first valve seal surface 21 and the second valve seal surface 22 are inclined, the first housing seal surface 23 and the second housing seal surface 24 are inclined as well in a corresponding manner.

A first valve stepped surface 31 connecting a first end of the first valve seal surface 21 and a first end of the second valve seal surface 22 is provided to an outer periphery of the valve body 15. A second valve stepped surface 32 connecting a second end of the first valve seal surface 21 and a second end of the second valve seal surface 22 is also provided on the outer periphery. The first valve stepped surface 31 and the second valve stepped surface 32 form the valve seal surface together with the first valve seal surface 21 and the second valve seal surface 22. That is, the first valve stepped surface 31 and the second valve stepped surface 32 function as a seal by making contact with a first housing stepped surface 33 and a second housing stepped surface 34, respectively. The first valve stepped surface 31 and the second valve stepped surface 32 function also as a stopper in the fully closed state and stop a rotation of the valve body 15 by making contact with the first housing stepped surface 33 and the second housing stepped surface 34, respectively.

The first valve stepped surface 31 and the second valve stepped surface 32 are also steps between boundaries of the first valve throttle surface 25 and the second valve throttle surface 26. The first valve stepped surface 31 and the second valve stepped surface 32 are planes parallel to the valve body center line D0 and perpendicular to the first valve throttle surface 25 and the second valve throttle surface 26, respectively.

The first valve throttle surface 25 is a cylindrical surface opposing the inner wall surface of the valve chamber α with a slight clearance in between and is also an outer peripheral surface of a cylindrical body about the rotation axis C2.

Likewise, the second valve throttle surface 26 is a cylindrical surface opposing the inner wall surface of the valve chamber α with a slight clearance in between and is also an outer peripheral surface of a cylindrical body about the rotation axis C2.

The first valve throttle surface 25 and the second valve throttle surface 26 function as an intake throttle valve which throttles the intake passage 3 as an opening degree increases.

Besides the first valve throttle surface 25 and the second valve throttle surface 26, the center throttle surface 30 of substantially a circular shape when viewed in a direction to the outer diameter is provided to the outer periphery of the valve body 15. The center throttle surface 30 is a cylindrical surface enclosed by the first valve seal surface 21 and the second valve seal surface 22 and is also an outer peripheral surface of a cylinder about the rotation axis C2.

It should be noted that the first seal distance r1 is made longer than the first valve throttle distance r5 and shorter than the second valve throttle distance r6. That is, a relationship expressed as: r5<r1<r6 is established.

The first housing seal surface 23 and the second housing seal surface 24 are provided to the seat part 16a which is incorporated into the housing 16 and thereby functions as a part of the housing 16.

To be more specific, the housing 16 is a die-cast molded article made of aluminum and the seat part 16a is a resin molded article moldable with high accuracy.

The first housing seal surface 23 and the second housing seal surface 24 are provided as cylindrical surfaces conforming to the first valve seal surface 21 and the second valve seal surface 22, respectively.

To be more specific, the first housing seal surface 23 is a part of an inner peripheral surface of the EGR passage 10 and is also a cylindrical surface with an inner peripheral surface facing in the valve opening direction.

The second housing seal surface 24 is a semi-cylindrical surface with an outer peripheral surface facing in the valve opening direction.

The second housing seal surface 24 is provided to a rib 16b of a semi-cylindrical shape protruding from the second opposing surface 28 of the seat part 16a into the valve chamber α.

It goes without saying that a tip end of the rib 16b is provided not to make contact with the outwardly facing surface of the valve body 15.

To be more specific, a distance in the radial direction from a tip end of the rib 16b to the rotation axis C2 is given as the rib end distance r9. Then, the rib end distance r9 is made longer than the first seal distance r1. In short, a relationship expressed as: r1<r9 is established.

The seat part 16a is provided with the first opposing surface 27 which opposes the first valve throttle surface 25 in the radial direction with a clearance in between in the fully closed state and the second opposing surface 28 which opposes the second valve throttle surface 26 in the radial direction with a clearance in between in the fully closed state.

The first opposing distance r7 described above is a distance in the radial direction from the first opposing surface 27 to the rotation axis C2 and the second opposing distance r8 is a distance in the radial direction from the second opposing surface 28 to the rotation axis C2.

Further, the seat part 16a is provided with the first housing stepped surface 33 which makes contact with the first valve stepped surface 31 in the rotational direction in the fully closed state and the second housing stepped surface 34 which makes contact with the second valve stepped surface 32 in the rotational direction in the fully closed state. The first housing stepped surface 33 and the second housing stepped surface 34 form the housing seal surface described above together with the first housing seal surface 23 and the second housing seal surface 24. The first housing stepped surface 33 and the second housing stepped surface 34 are also steps between boundaries of the first opposing surface 27 and the second opposing surface 28. The first housing stepped surface 33 and the second housing stepped surface 34 are planes parallel to the y-axis direction and perpendicular to the first opposing surface 27 and the second opposing surface 28, respectively.

In an example described herein, the first valve stepped surface 31 and the second valve stepped surface 32 are provided perpendicularly to the first valve throttle surface 25 and the second valve throttle surface 26, respectively. However, the present disclosure is not limited to the configuration as above and each may be inclined with respect to the rotational direction.

When the first valve stepped surface 31 and the second valve stepped surface 32 are inclined, the first housing stepped surface 33 and the second housing stepped surface 34 are inclined as well in a corresponding manner.

As has been described, the EGR device includes the valve body 15 having the outwardly facing surface out of contact with the housing 16. Hence, when the valve body 15 is rotated, the outwardly facing surface of the valve body 15 does not slide on the housing 16. An inconvenience arising from sliding of the valve body 15 can be thus avoided. More specifically, sliding of the valve body 15 raises an inconvenience that a sliding portion wears out. However, such wear-out can be avoided. Sliding of the valve body 15 also raises an inconvenience that an operation torque of the valve body 15 increases. However, an operation torque of the valve body 15 can be reduced because the valve body 15 does not slide on the housing 16. Further, sliding of the valve body 15 may possibly generate sliding noise. However, no sliding noise is generated because the valve body 15 does not slide on the housing 16.

Meanwhile, while the valve opening 10a is closed by the valve body 15, that is, in the fully closed state, the valve-facing surface of the valve body 15 closes the valve opening 10a by making contact with the seat part 16a of the housing 16. Of contact surfaces of the valve body 15 and the housing 16 where contact is made, faces of the contact surfaces where the first valve seal surface 21 and the first housing seal surface 23 make contact with each other and faces of the contact surfaces where the second valve seal surface 22 and the second housing seal surface 24 make contact with each other are formed of a cylindrical surface (an example of the curved surface).

To be more specific, the valve body 15 and the housing 16 make contact with each other in the fully closed state and provide sealing at four points as follows.

A first contact point is a contact point of two semi-cylindrical surfaces between the first valve seal surface 21 and the first housing seal surface 23.

A second contact point is a contact point of two semi-cylindrical surfaces between the second valve seal surface 22 and the second housing seal surface 24.

A third contact point is a contact point of two planes between the first valve stepped surface 31 and the first housing stepped surface 33.

A fourth contact point is a contact point of two planes between the second valve stepped surface 32 and the second housing stepped surface 34.

A range where biting occurs in the valve-facing surface in the fully closed state can be limited to a narrow range at both ends of the first valve seal surface 21 and both ends of the second valve seal surface 22. That is, a biting area of the valve-facing surface in the fully closed state can be smaller than in the related art. Hence, biting hardly occurs in comparison with the related art. A drive torque required to rotate the valve body in the fully closed state in the valve opening direction can be thus smaller than in the related art.

Consequently, the drive unit 12 can be more compact and the EGR valve 11 can be more readily equipped to a vehicle. In addition, the drive unit 12 consumes less power.

The biting means a binding force produced on an inclined surface by friction and pressing. A strong binding force is produced between two inclined surfaces pressed hard against each other as the principle of a wedge. That is, when a contact surface is inclined with respect to a force applying direction, a thrusting force acting on the inclined surface in a vertical direction increases as an inclined angle becomes smaller. A pressing force reacting to the thrusting force is also applied to the inclined surface. The binding force is produced on the inclined surface when the pressing force acts on a frictional face of the inclined surface. The force thus produced is called the biting.

As is shown in FIG. 4C, the housing 16 of the first embodiment is formed to have the channel center of the upstream passage 17 and the channel center of the downstream passage 18 on the same straight line C1.

In the present embodiment, the rotation axis C2 is positioned off the channel center of the upstream passage 17 and the channel center of the downstream passage 18 in the z-axis direction nearing the valve opening 10a. An offset amount is indicated by an alpha-numeric character OF1 in FIG. 4C.

In the present embodiment, a center C3 of the valve opening 10a is positioned off the virtual line β described above in the x-axis direction nearing the downstream passage 18. An offset amount is indicated by an alpha-numeric character OF2 in FIG. 4C.

The configuration as above enables to allocate a dead zone where the valve body 15 does not throttle the upstream passage 17 even when the valve body 15 rotates from the fully closed position within a predetermined range. A range of the dead zone where the valve body 15 does not throttle the upstream passage 17 even when the valve body 15 rotates is indicated by a Greek letter γ in FIG. 4C.

An allocation of the dead zone will be described in the following by giving an angle of the valve body 15 when the valve body 15 completely closes the EGR passage 10 as a fully closed angle θ0, an angle of the valve body 15 when the valve body 15 throttles the upstream passage 17 to a maximum extent as a maximum angle θx, and a predetermined angle between the fully closed angle θ0 and the maximum angle θx as an intermediate angle θ1. The intermediate angle θ1 is an angle of the valve body 15 when the valve body 15 starts to throttle the upstream passage 17.

By adopting the configuration as above, the upstream passage 17 is maintained at a maximum opening degree within a range from the fully closed angle θ0 to the intermediate angle θ1 because the valve body 15 does not throttle the upstream passage 17.

Meanwhile, when an angle of the valve body 15 exceeds the intermediate angle θ1, the valve body 15 starts to throttle the upstream passage 17. Accordingly, while an angle of the valve body 15 increases in a range from the intermediate angle θ1 corresponding to an intermediate opening degree to the maximum angle θx corresponding to a maximum opening degree, the valve body 15 moves in a direction to throttle the upstream passage 17 more as an angle of the valve body 15 increases. In the manner as above, the EGR valve 11 of the present embodiment throttles the upstream passage 17 after an opening degree of the EGR passage 10 exceeds the predetermined opening degree. In the present embodiment, the maximum opening degree can be also said as a fully opened angle. When an angle of the valve body 15 is the fully opened angle, the EGR valve 11 is in a fully opened state.

Figure 5:
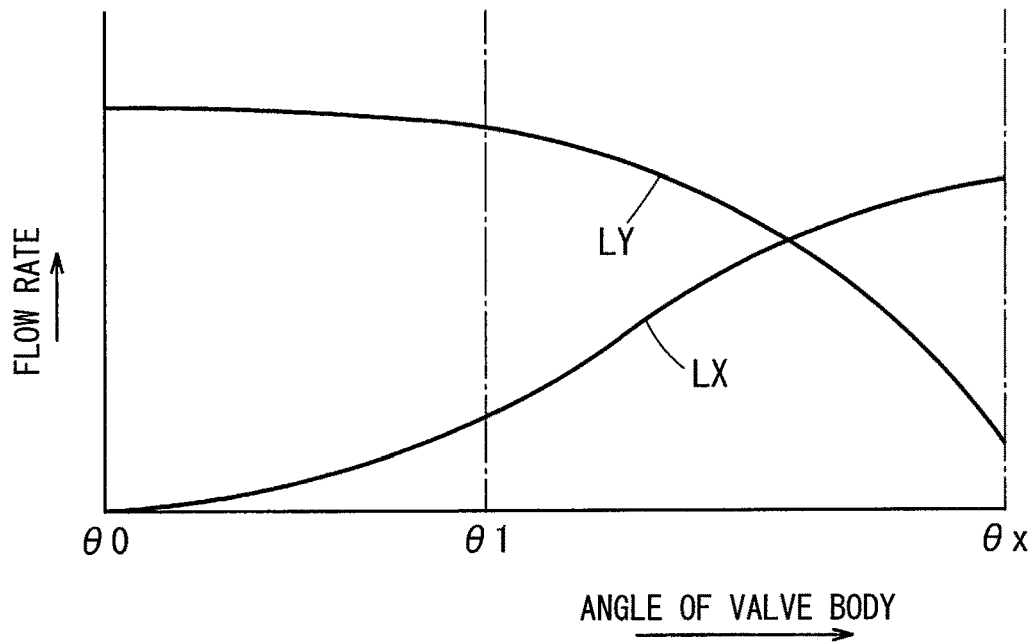
FIG. 5 is a view used to describe a variance in flow rate with an angle of the valve body in the first embodiment.

In FIG. 5, a solid line LX represents a variance in EGR flow rate, which is a flow rate of the EGR gas, with an angle of the valve body 15, and a solid line LY represents a variance in intake flow rate, which is a flow rate of intake air, with an angle of the valve body 15.

In the first embodiment, the first valve throttle surface 25 provided to the valve body 15 opposes the first opposing surface 27 of the housing 16 with a slight clearance in between in the fully closed state. Likewise, the second valve throttle surface 26 provided to the valve body 15 opposes the second opposing surface 28 of the housing 16 with a slight clearance in between in the fully closed state.

The configuration as above enables the first valve throttle surface 25 and the second valve throttle surface 26 to throttle an inner space between the valve chamber α and the EGR passage 10. Owing to such a throttling effect, leakage of the EGR gas into the intake passage 3 in the fully closed state can be reduced.

Second Embodiment

Figure 6:
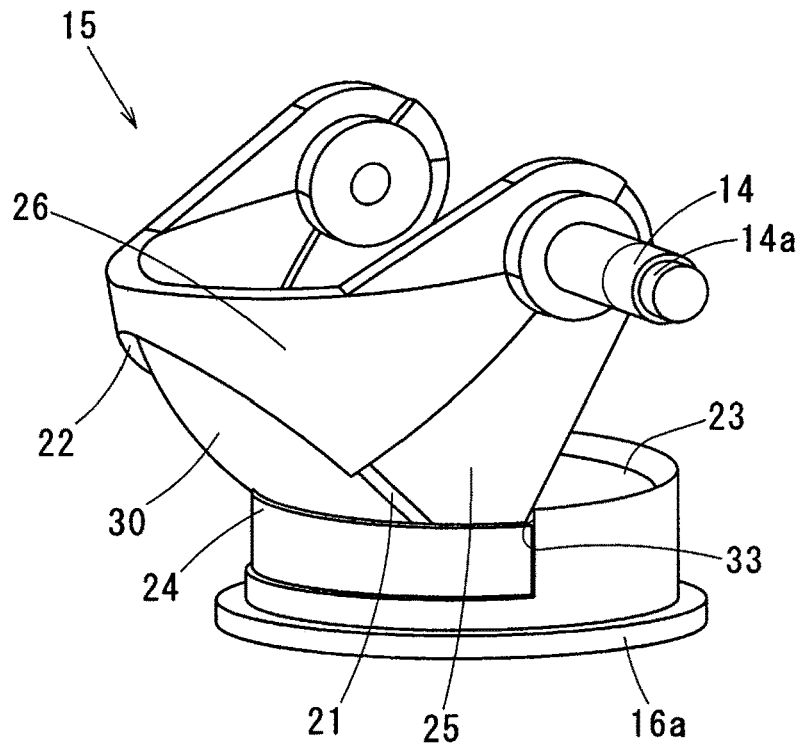
FIG. 6 is a perspective view of a valve body and a seat part according to a second embodiment of the present disclosure.
Figure 7:
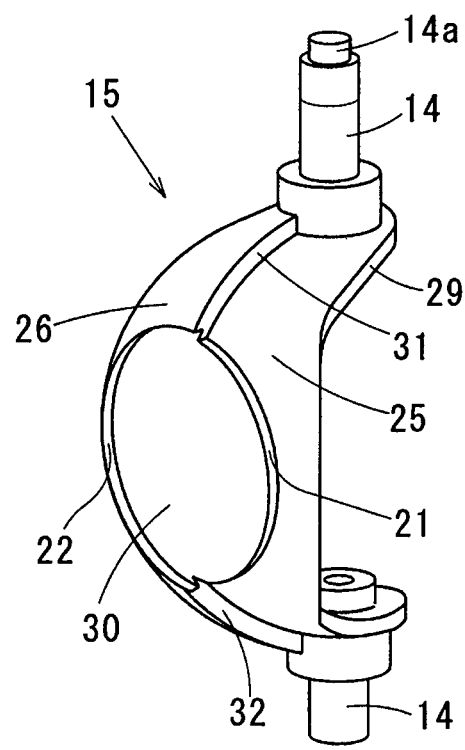
FIG. 7 includes (a) and (b), (a) is a perspective view of the valve body in the second embodiment and (b) is a perspective view of the seat part in the second embodiment.
Figure 7:
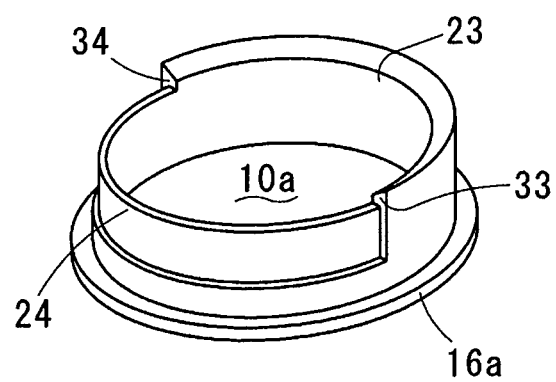

A second embodiment will now be described according to FIG. 6 and FIGS. 7A and 7B. In respective embodiments below, components functioning in same manners are labelled with same reference numerals used in the first embodiment above. The following will describe only differences from the first embodiment above and reference should be made to the description above for components undescribed in the second and following embodiments below.

The EGR valve 11 of the first embodiment above is a rotary valve in which the valve body 15 has the outer peripheral surface of a cylindrical shape.

In contrast, the second embodiment adopts a ball valve in which the valve body 15 has an outer peripheral surface of a spherical shape. To be more specific, each of the first valve throttle surface 25, the second valve throttle surface 26, and the center throttle surface 30 is of a spherical shape.

Even when the configuration is modified as above, effects same as the effects of the first embodiment above can be achieved.

Third Embodiment

A third embodiment will now be described according to FIG. 8.

In the third embodiment, a center D1 of a cylinder forming the first valve seal surface 21 is positioned off a valve body center line D0 in a valve opening direction, and a center D2 of a cylinder forming the second valve seal surface 22 is positioned off the valve body center line D0 in a valve closing direction.

Figure 8:
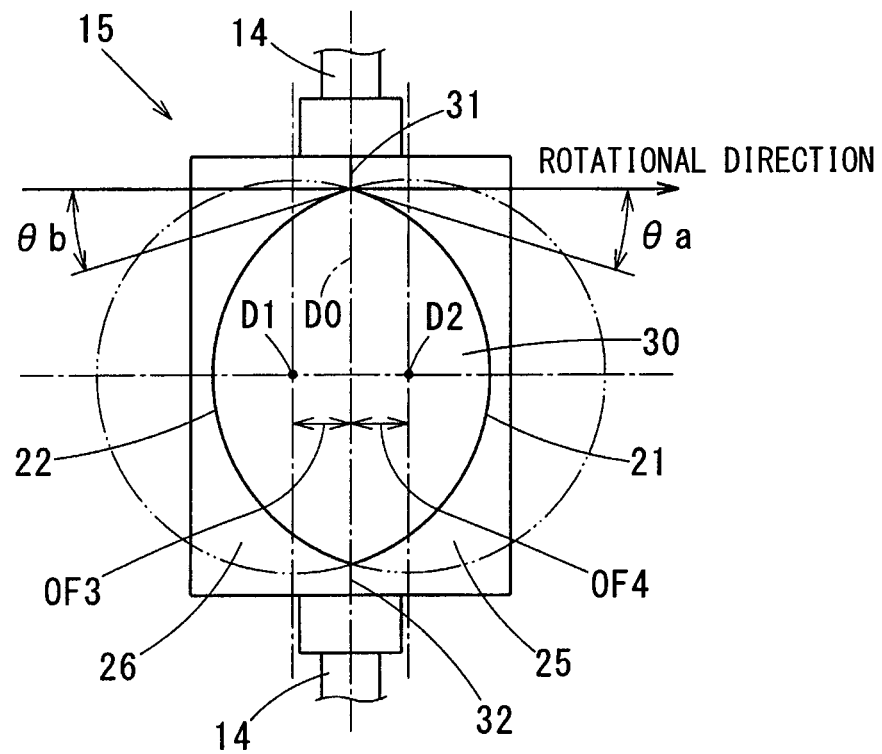
FIG. 8 is a view used to describe a valve seal surface when a valve body according to a third embodiment of the present disclosure is viewed in a direction to an outer diameter.

An offset amount of the center D1 of the cylinder forming the first valve seal surface 21 from the valve body center line D0 is indicated by an alpha-numerical character OF3 in FIG. 8.

An offset amount of the center D2 of the cylinder forming the second valve seal surface 22 from the valve body center line D0 is indicated by an alpha-numeric character OF4 in FIG. 8.

Owing to the configuration as above, an angle θa of a tangential line to an end of the first valve seal surface 21 with respect to a rotational direction can be increased.

An angle θb of a tangential line to an end of the second valve seal surface 22 with respect to the rotational direction can be increased as well.

Consequently, sliding and wear-off between the first valve seal surface 21 and the first housing seal surface 23 in a state close to a fully closed state can be reduced.

Sliding and wear-off between the second valve seal surface 22 and the second housing seal surface 24 in a state close to the fully closed state can be reduced as well.

Fourth Embodiment

Figure 9:
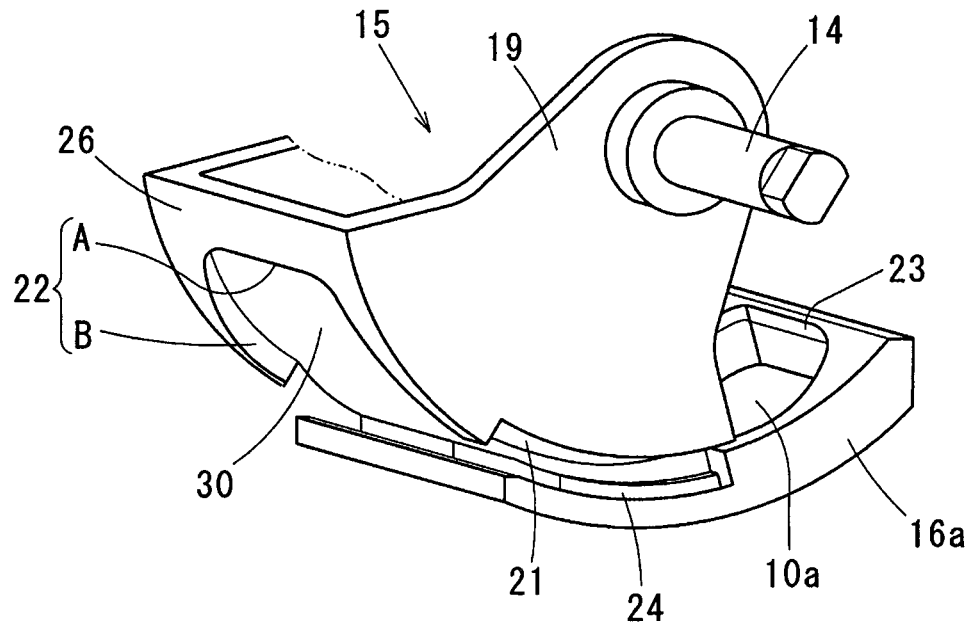
FIG. 9 is a perspective view of a valve body and a seat part according to a fourth embodiment of the present disclosure.
Figure 10:
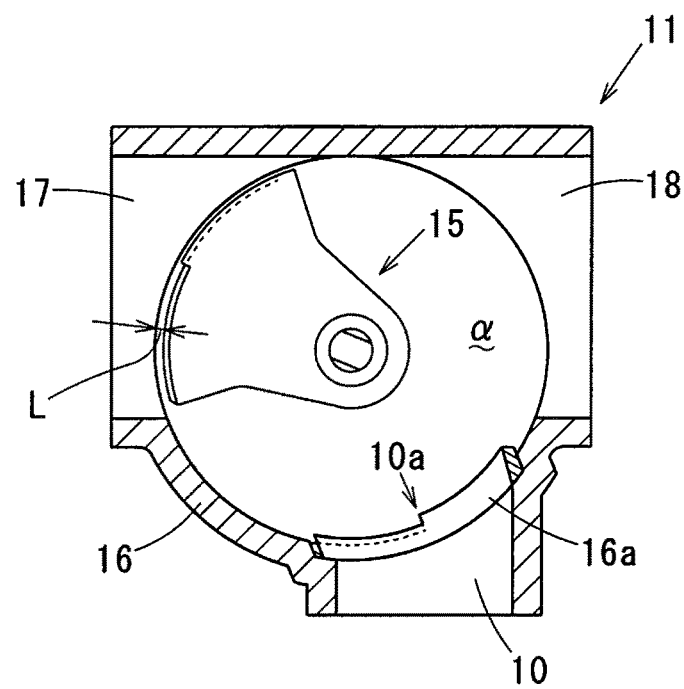
FIG. 10 is a sectional view of an EGR valve in a fully opened state in the fourth embodiment.
Figure 11:
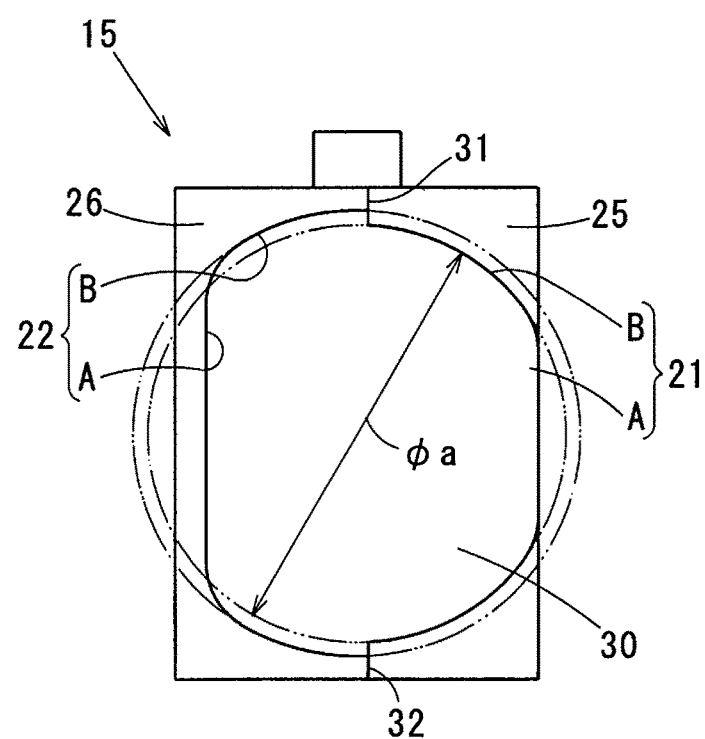
FIG. 11 is a view of a valve body when viewed in a direction to an outer diameter in the fourth embodiment.

A fourth embodiment will now be described according to FIG. 9 through FIG. 11.

In the fourth embodiment, each of the first valve seal surface 21 and the second valve seal surface 22 is formed in a shape of an arc B combined with a straight line A parallel to a y-axis direction when the valve body 15 is viewed in a direction to an outer diameter.

It goes without saying that the first housing seal surface 23 and the second housing seal surface 24 are formed in shapes conforming, respectively, to the first valve seal surface 21 and the second valve seal surface 22 in a fully closed state.

More specifically, when the valve body 15 is viewed in a direction from the outer diameter to an inner diameter, arcs B provided to the first valve seal surface 21 and the second valve seal surface 22 are provided to fit to an inner diameter φa of the EGR passage 10 or provided on an outer side of the inner diameter φa of the EGR passage 10.

Owing to the configuration as above, an area of the center throttle surface 30 can be increased. Hence, a clearance L enabling to achieve a throttling effect can be formed between the center throttle surface 30 and an inner peripheral wall of a valve chamber α at a maximum angle θx. Consequently, the throttling effect on the upstream passage 17 by the valve body 15 can be enhanced at the maximum angle θx.

Fifth Embodiment

Figure 12:
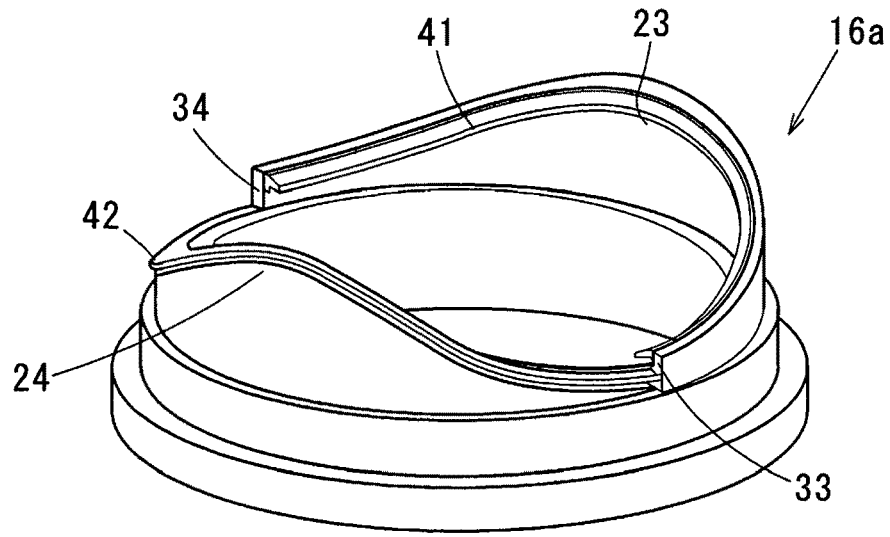
FIG. 12 is a perspective view of a seat part according to a fifth embodiment of the present disclosure.

A fifth embodiment will now be described according to FIG. 12.

In the fifth embodiment and a sixth embodiment below, a seal member made of rubber or resin or formed of a metal spring or the like is provided to at least one of a valve seal surface and a housing seal surface. An example of resin is PTFE (polytetrafluoroethylene).

To be more specific, seal members are provided to the first housing seal surface 23 and the second housing seal surface 24 in the fifth embodiment.

In the following description, a seal member provided to the first housing seal surface 23 is given as a first housing seal member 41 and a seal member provided to the second housing seal surface 24 is given as a second housing seal member 42.

A concrete example of the first housing seal member 41 and the second housing seal member 42 is a lip seal made of rubber which is attached to each of the first housing seal surface 23 and the second housing seal surface 24 by a bonding technique, such as welding and pasting, so as not to peel off.

By providing the first housing seal member 41 and the second housing seal member 42, respectively, to the first housing seal surface 23 and the second housing seal surface 24 in the manner as above, leakage of an EGR gas in a fully closed state can be prevented in a more reliable manner.

More specifically, the first valve stepped surface 31 and the second valve stepped surface 32 make contact with the first housing stepped surface 33 and the second housing stepped surface 34, respectively, in the fully closed state. A space between the first valve stepped surface 31 and the first housing stepped surface 33 is therefore sealed and a space between the second valve stepped surface 32 and the second housing stepped surface 34 is also sealed. At a same time, the first housing seal member 41 seals a space between the first valve seal surface 21 and the first housing seal surface 23 in a reliable manner and the second housing seal member 42 seals a space between the second valve seal surface 22 and the second housing seal surface 24 in a reliable manner.

Sixth Embodiment

Figure 13:
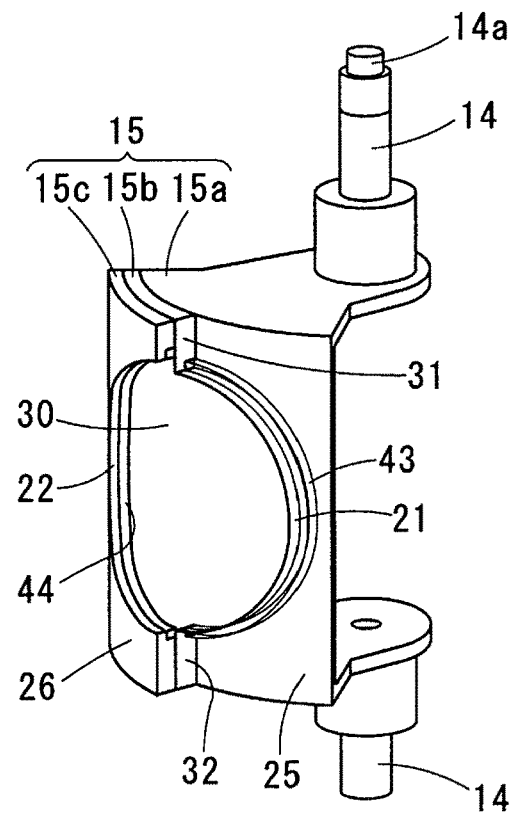
FIG. 13 is a perspective view of a valve body according to a sixth embodiment of the present disclosure.
Figure 14:
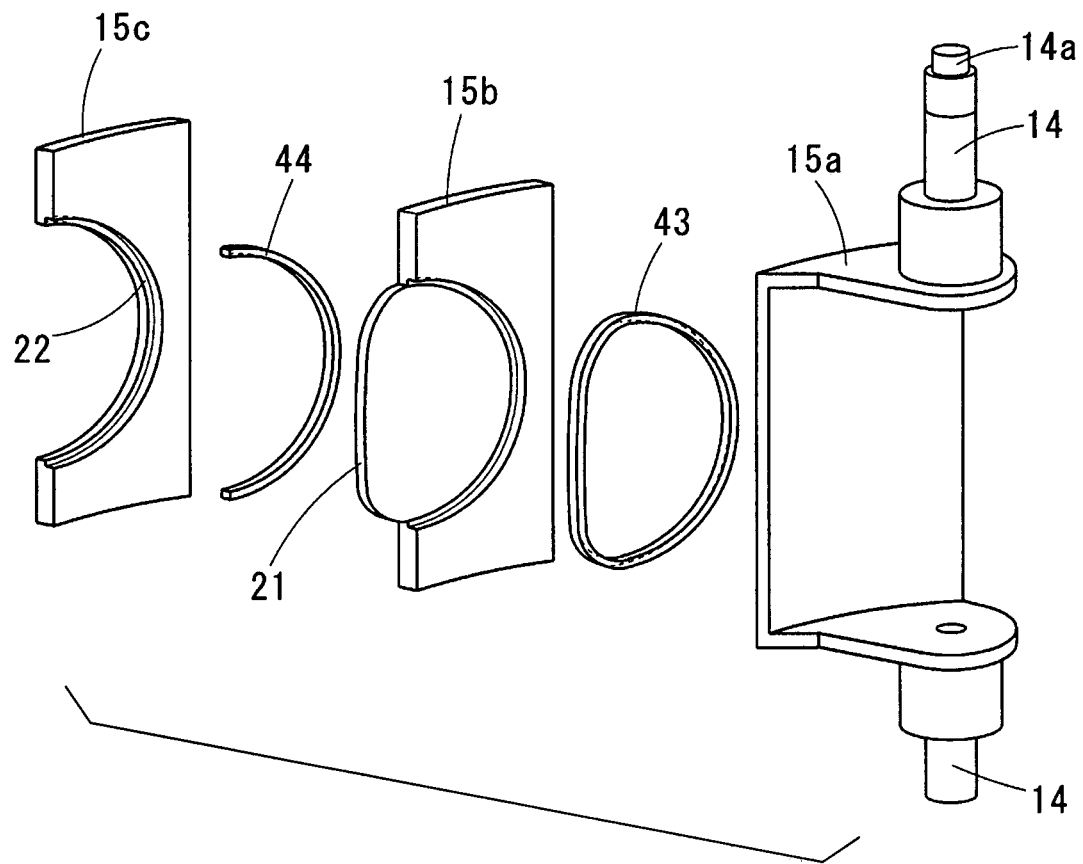
FIG. 14 is an exploded perspective view of the valve body in the sixth embodiment.
Figure 15:
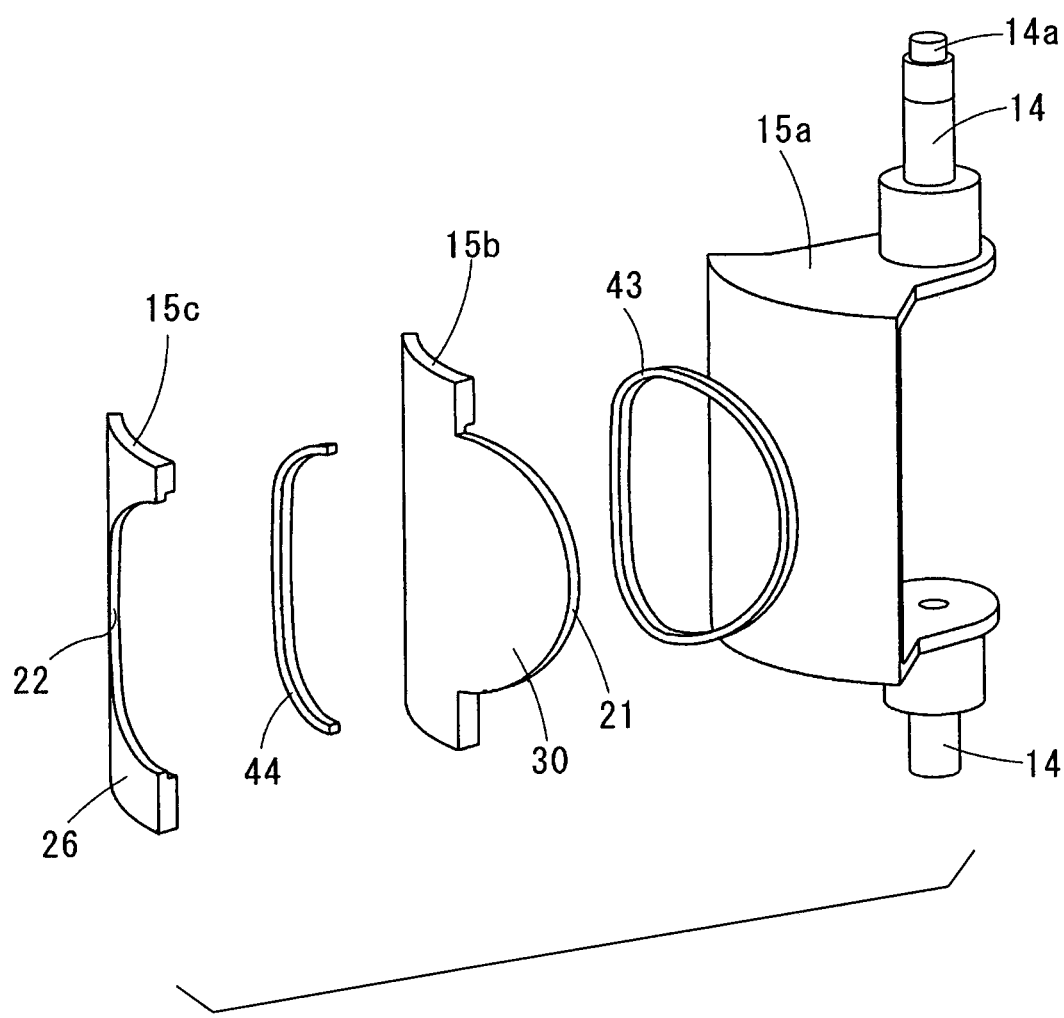
FIG. 15 is an exploded view of the valve body when viewed in a direction different from the direction of FIG. 14 in the sixth embodiment.

A sixth embodiment will now be described according to FIG. 13 through FIG. 15.

In the sixth embodiment, seal members are provided to the first valve seal surface 21 and the second valve seal surface 22.

In the following description, a seal member provided to the first valve seal surface 21 is given as a first valve seal member 43 and a seal member provided to the second valve seal surface 22 is given as a second valve seal member 44.

The first valve seal member 43 and the second valve seal member 44 are either made of rubber or resin or formed of a metal spring. As are shown in FIG. 14 and FIG. 15, the first valve seal member 43 is of a ring shape and the second valve seal member 44 is of a semi-circular shape.

More specifically, the valve body 15 of the sixth embodiment includes a valve body base 15a where the first valve throttle surface 25 is provided, an intermediate layer 15b where the center throttle surface 30 is provided, and a surface layer 15c where the second valve throttle surface 26 is provided, which are sequentially laminated in a direction of radius.

The first valve seal member 43 is sandwiched and supported between the valve body base 15a and the intermediate layer 15b. The second valve seal member 44 is sandwiched and supported between the intermediate layer 15b and the surface layer 15c.

By providing the first valve seal member 43 and the second valve seal member 44, respectively, to the first valve seal surface 21 and the second valve seal surface 22 in the manner as above, leakage of an EGR gas in a fully closed state can be prevented in a more reliable manner as in the fifth embodiment above.

Naturally, the fifth embodiment above and the sixth embodiment may be combined.

Other Embodiments

The embodiments above have described a case where the present disclosure is applied to the EGR valve 11 employed in an EGR device of an LPL type. It should be appreciated, however, that the embodiments above do not limit uses of a valve device to which the present disclosure is applied. To be more specific, the present disclosure is also applicable to a wider range including various types of rotary valves and ball valves.

The embodiments above have described a case where the present disclosure is applied to a valve device having a three-way valve structure. However, applications of the present disclosure are not limited to the three-way valve structure. That is, the present disclosure may be applied also to a valve device having a two-way valve structure or a four or more-way valve structure.

To be more specific, as an example of other preferred embodiments as an application of the present disclosure, the present disclosure may be applied to a coolant control valve which controls switching and a flow rate of an engine coolant. Alternatively, the present disclosure may be applied to a vehicle air-conditioning device which switches outlets, controls an air-fuel mixture, and switches from inside air to outside air and vice versa by using a rotary valve.

The embodiments above have described a case where the seat part 16a is provided separately and attached to the housing 16 with an aim of improving molding accuracy of the first housing seal surface 23 and the second housing seal surface 24. However, the first housing seal surface 23 and the second housing seal surface 24 may be directly provided to the housing 16 without providing the seat part 16a separately.

The embodiments above have described a case where the electrical drive unit 12 is used as a drive portion driving the valve body 15. However, the present disclosure is not limited to the described case and other drive sources, such as a negative pressure and a hydraulic pressure, may be used instead. It goes without saying that the present disclosure may be applied to a valve device in which the valve body 15 is manually operated.

The embodiments above have described a case where the first valve throttle surface 25 and the second valve throttle surface 26 are provided to the valve body 15. However, the valve body 15 may be provided with either one or none of the first valve throttle surface 25 and the second valve throttle surface 26.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A valve device, comprising:
a shaft to rotate in response to an operation;
a valve body to rotate integrally with the shaft and to have an outer peripheral surface provided with at least a part of a cylindrical surface or a spherical surface; and
a housing including a valve opening in a valve chamber to rotatably store the valve body, the valve opening to be opened and closed by the valve body, wherein
when a direction along a radius of the shaft is expressed as a radial direction including a direction to an outer diameter and a direction to an inner diameter, a surface of the valve body facing in a direction to the outer diameter is expressed as an outwardly facing surface, a direction in which the valve body rotates about the shaft is expressed as a rotational direction, and a surface of the valve body facing in the rotational direction is expressed as a valve-facing surface, the outwardly facing surface of the valve body is to be out of contact with the housing and the valve-facing surface is to be in contact with the housing in a fully closed state in which the valve body closes the valve opening,
when the rotational direction toward a direction in which the valve body closes the valve opening is expressed as a valve closing direction, the rotational direction toward a direction in which the valve body opens the valve opening is expressed as a valve opening direction, a surface of the valve-facing surface making contact with the housing in the fully closed state is expressed as a valve seal surface, and a surface of the housing where contact with the valve seal surface is expressed as a housing seal surface, the valve seal surface includes a first valve seal surface that protrudes in the valve closing direction and a second valve seal surface that is recessed in the valve opening direction,
when a rotation center of the shaft and the valve body is expressed as a rotation axis, a distance in the radial direction from an outer diameter end of the first valve seal surface to the rotation axis is expressed as a first seal distance, and a distance in the radial direction from an outer diameter end of the second valve seal surface to the rotation axis is expressed as a second seal distance, the first seal distance is shorter than the second seal distance, and
the first valve seal surface and the second valve seal surface each have at least a curved surface.

2. The valve device according to claim 1, wherein
each of the first valve seal surface and the second valve seal surface is a cylindrical surface, and
a center of a cylinder constituting the first valve seal surface and a center of a cylinder constituting the second valve seal surface fall on each other.

3. The valve device according to claim 2, wherein
a radius of the cylinder constituting the second valve seal surface is larger than a radius of the cylinder constituting the first valve seal surface.

4. The valve device according to claim 1, wherein
each of the first valve seal surface and the second valve seal surface is a cylindrical surface, and
when a center of an outer peripheral surface of the valve body in the rotational direction is expressed as a valve body center line, a center of a cylinder constituting the first valve seal surface is positioned off the valve body center line in the valve opening direction while a center of a cylinder constituting the second valve seal surface is positioned off the valve body center line in the valve closing direction.

5. The valve device according to claim 1, wherein
the valve body includes a valve throttle surface opposing an inner wall surface of the valve chamber with a clearance in between in the fully closed state, and
when a face of the valve throttle surface at one end in the valve closing direction is expressed as a first valve throttle surface and a face at one end in the valve opening direction is expressed as a second valve throttle surface, a distance in the radial direction from the first valve throttle surface to the rotation axis is expressed as a first valve throttle distance, and a distance in the radial direction from the second valve throttle surface to the rotation axis is expressed as a second valve throttle distance, the first valve throttle distance is shorter than the second valve throttle distance.

6. The valve device according to claim 1, wherein
the housing includes an upstream passage to introduce a fluid outside the housing into the valve chamber, and a downstream passage to introduce a fluid in the valve chamber to an outside of the housing in addition to a passage communicating with the valve opening,
a channel center of the upstream passage and a channel center of the downstream passage are on a same straight line,
when an extending direction of the channel center of the upstream passage and the channel center of the downstream passage is expressed as an x-axis direction, the rotation axis is set in a y-axis direction perpendicular to the x-axis direction,
when a direction perpendicular to both of the x-axis direction and the y-axis direction is expressed as a z-axis direction, the rotation axis is positioned off the channel center of the upstream passage and the channel center of the downstream passage in the z-axis direction, and
when a straight line passing the rotation axis and extending in the z-axis direction is expressed as a virtual line, a center of the valve opening is positioned off the virtual line in the x-axis direction.

7. The valve device according to claim 6, wherein
the upstream passage and the downstream passage are a part of an intake passage introducing intake air to an engine,
the valve opening is an end of an EGR passage through which a part of an exhaust gas discharged from the engine is returned to the intake passage as an EGR gas, and
the valve body adjusts an opening degree of the EGR passage and an opening degree of the upstream passage when a rotational angle of the shaft is changed.

8. The valve device according to claim 1, wherein
when an extending direction of the rotation axis is expressed as a y-axis direction, the valve seal surface is in a shape of an arc combined with a straight line parallel to the y-axis direction when the valve body is viewed in a direction to the outer diameter.

9. The valve device according to claim 1, wherein
a seal member is provided to at least one of the valve seal surface and the housing seal surface.

* * * * *